Oct. 26, 1965 L. W. COOK 3,213,984
SERVO-OPERATED CLUTCH TRANSMISSION
HAVING FRICTION BRAKE MEANS
Filed Dec. 29, 1961

Inventor:
Leo W. Cook
By: Joseph W. Malleck Atty.

United States Patent Office 3,213,984
Patented Oct. 26, 1965

3,213,984
SERVO-OPERATED CLUTCH TRANSMISSION
HAVING FRICTION BRAKE MEANS
Leo W. Cook, Chicago, Ill., assignor to Borg-Warner
Corporation, Chicago, Ill., a corporation of Illinois
Filed Dec. 29, 1961, Ser. No. 163,179
3 Claims. (Cl. 192—18)

This invention relates to clutch mechanisms and more particularly to a power take-off device having a clutch mechanism and which is particularly suitable for agricultural tractors and the like.

The primary object of this invention is to provide an improved power take-off clutch assembly having means to preclude rotation of the power take-off shaft or driven shaft when the clutch is disengaged.

Another object of this invention is to provide an improved power take-off assembly having a hydraulically actuated clutch device and in which a brake means is provided correlated in its operation with the engagement of the hydraulically actuated clutch to preclude free rotation of the power take-off shaft or driven shaft when the clutch mechanism is disengaged.

Still another object of this invention is to provide an improved power take-off assembly of the type above described in which the brake means is automatically disengaged upon engagement of the clutch mechanism.

Still another object of this invention is to provide an improved power take-off assembly of the above type having a brake means precluding rotation of the power take-off shaft when the clutch is disengaged, and which is particularly characterized by its reliability, simplicity and economy of manufacture.

Figure 1:
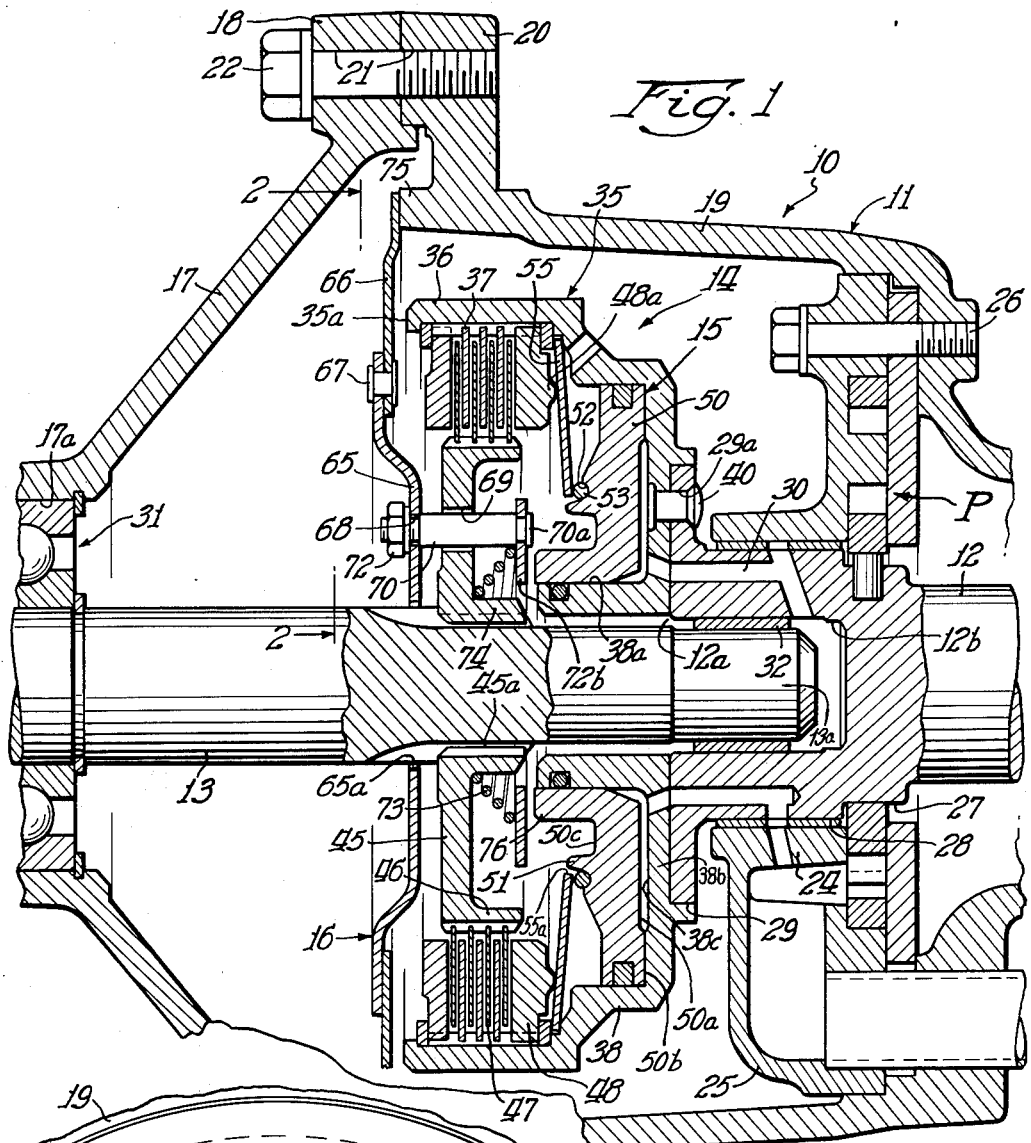
Figure 2:
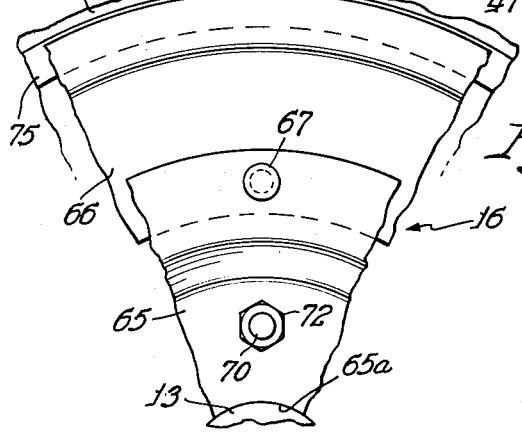

This invention consists of the novel construction, arrangment and device to be hereinafter described and claimed for carrying out the above-stated objects and such other objects as will be apparent from the following description of a preferred form of this invention and illustrated with reference to the accompanying drawings, wherein:

FIGURE 1 is an elevational view, partly in section, illustrating a power take-off assembly and embodying the features of this invention; and FIGURE 2 is a fragmentary view taken substantially along line 2—2 of FIGURE 1.

Referring now to the drawings, wherein is shown a preferred embodiment of this invention, the power take-off assembly, generally indicated by the numeral 10, comprises a housing 11 within which extends a driving shaft 12 adapted to be connected to a suitable power source (not shown) and a driven shaft 13 adapted for connection to auxiliary work performing means such as are usually employed in agricultural vehicles. The shafts 12 and 13 are adapted for selective conjoint rotation by engageable means or clutch device 14 having a hydraulically actuated servo motor including a piston assembly 15. The driven shaft 13 is splined to a brake means 16 adapted to frictionally engage the housing 11 so as to preclude free rotation of the driven shaft when the clutch devce 14 is disengaged.

Turning now more particularly to the construction of the above elements, the housing 11 is seen to comprise a first section 17 of generally conical shape having a radially extending peripheral flange 18 and a second section 19 of generally cylindrical configuration having a radially extending flange 20 at one end. Each of said section flanges have a plurality of circumferentially spaced openings 21 in alignment with corresponding openings of the opposed flange. The flanges are adapted to be secured together by cap screws 22 received in openings of one of the flanges and threadably received by the openings in the other opposed flange.

The driving shaft 12 extends into the housing 11 from the right-hand side, as viewed in FIGURE 1, and is journaled in a bearing (not shown) disposed at an outer extremity of the section 19 and is rotatably received within a sleeve 24 carried on a plate assembly 25 which is secured to the interior of the housing section 17 by suitable fasteners 26. The end 12a of the driving shaft comprises a series of stepped portions 27, 28 and 29, each of which are disposed on the outer surface of the shaft 12. The end-most stepped portion 29 is formed as a radially extending flange having a plurality of circumferentially spaced openings 29a therein. The shaft 12 is provided with suitable internal conduit means 30 which are adapted to be communicated with a source of fluid pressure from pump P. The end 12a of the driving shaft has a central bore 12b formed therein adapted to telescopically receive a terminal portion 13a of driven shaft 13.

The driven shaft 13 extends into the housing 11 through a central opening 17a provided in the housing section 17 and is journaled therein by a bearing 31. The terminal portion 13a of the driven shaft is also journaled within the central bore of the driving shaft by suitable bushings 32.

The gradually engageable clutch means 14 comprises a drum or casing 35 open at one end 35a and has a first cylindrical portion 36 provided with a plurality of radially extending friction rings 37 each of which is splined to the interior surface of the drum portion 36. A reduced drum or cylindrical portion 38 is provided at the closed end thereof and is adapted to define an annular interior piston chamber 38a having generally cylindrical inner and outer walls. The end wall of the drum 38 forming part of the piston chamber 38a is adapted to be fastened to the stepped portion 29 of the driving shaft 12 by suitable fasteners 40 extending through openings 29a.

The driven elements of the gradually engageable means 14 comprise an annular plate or hub 45 having a central opening 45a with opening defining walls thereof being splined to the driven shaft 13 and adapted to slide longitudinally therealong. The driven plate 45 has an axially extending flange 46 at its outer extremity adapted to carry a plurality of radially extending friction rings 47 splined thereto and interleaved with friction rings 37 splined to the inner periphery of drum 35 to thus form a clutch pack.

An annular pressure plate or member 48 is disposed at one side of the series of friction rings or clutch pack and is adapted to be urged toward said friction rings for providing conjoint rotation therebetween. The pressure plate 48 is adapted to be clutch engagingly actuated by piston assembly 15 which comprises a piston 50 slidably received in piston chamber 38a of reduced drum or cylinder 38. The piston 50 has a portion 50a on end face 50b recessed to provide a small chamber in cooperation with end wall 38b of drum 35 which similarly has a partially recessed portion 38c. The chamber defined by recesses 50a and 38c is adapted to be in communication with fluid conduit means 30 in driving shaft 12 whereby fluid pressure from pump P may be brought to act upon said piston 50. The piston further has a shoulder 51 extending axially outwardly from its opposite side 50c adapted to receive an annular ring 53 in a groove 52 formed therein to serve as a thrust bearing for a Belleville spring diaphragm 55.

The piston 50 is operably associated with pressure plate 48 by the Belleville spring diaphragm 55. The outer margin of the spring diaphragm engages an annular boss 48a formed on pressure plate 48 and the radially innermost terminal portion 55a of the spring diaphragm 55 bears against the ring 53 seated in the annular groove 52 of the piston member 50. The Belleville diaphragm 55 functions to impart thrust between the piston 50 and the pressure plate 48 in a conventional manner whereby upon movement of the inner periphery of the diaphragm to the left as shown in FIG. 1, the intermediate portion of the diaphragm will urge the pressure plate to the left under a leverage principal. The Belleville diaphragm normally has a conical shape and will tend to revert to such configuration upon release of the actuating force on the piston, to retract the piston 50.

In order to prevent the driven shaft 13 from rotating during a non-engaged condition of the clutch device 14, the brake means 16 is uniquely adapted to cooperate with the power take-off assembly 10. The brake means 16 comprises an annular generally flat disc 65 having a central opening 65a through which the driven shaft extends and has walls slightly spaced from the outer surface of said driven shaft. The radially outermost margin of said hub is adapted to carry an annular friction shoe 66 secured to the hub by suitable rivets 67. An intermediate portion of the disc 65 has provided therein a plurality of circumferentially spaced openings 68 in alignment with a plurality of circumferentially spaced openings 69 provided in an intermediate portion of the driven plate 45.

The disc 65 is mounted on the driven plate or hub 45 for axial movement relative thereto by plurality of pins 70 each having one end 70a extending through an opening in the disc 65 and an intermediate portion extending through an opening in the driven plate 45. Outermost ends of the pins each carry stop or bumper ring 72b adapted to limit the axial movement of said disc 65 relative to the driven plate. A conically shaped coiled spring member 73 is disposed about an inner sleeve 74 of the driven plate 45 and is adapted to bear between the driven plate and the stop or bumper ring 72b on pins 70. The spring 73 normally urges the pins, and thereby the brake assembly, to the right as shown in FIGURE 1, in order to bring the friction shoe 66 into engagement with an annular boss 75 formed on the interior of the housing section 19.

The piston 50 has an inner axially extending sleeve or central neck 76 extending toward the stop or bumper ring 72b of the brake means 16 and is arranged to engage the stop or bumper ring 72b when the piston 50 is at or about the fully engaged clutch position whereby the friction shoe 66 is moved out of engagement with the housing boss 75.

To briefly describe the operation of the power take-off assembly, it will be seen that during the disengaged condition of the multiple disc clutch pack of the preferred embodiment, the brake means 16 is adapted to be moved into friction engagement with the housing boss 75 by the Belleville spring diaphragm 55 to preclude any free rotation of the driven shaft. It will be noted that in this condition, the piston 50 has the sleeve 76 spaced from the stop or bumper ring 72b.

Upon bringing the clutch pack toward the engaged condition, the piston 50 will move to the left, as viewed in FIGURE 1, loading the Belleville spring diaphragm 55 to drive the pressure member 48 toward the clutch disc pack and correspondingly will bring the inner sleeve 76 against the stop or bumper ring 72b of the brake means whereby spring 73 is compressed and the brake means 16 is moved to the left causing the brake shoe 66 to disengage from the housing boss 75. Thus, the driven shaft will be connected to the driving shaft and the retarding effect of the brake means removed.

While I have described my invention in connection with a certain specific construction and arrangement, it is to be understood that this is by way of illustration and not by way of limitation, and that the scope of my invention is defined solely by the appended claims which should be construed as broadly as the prior art will permit.

I claim:

1. The combination comprising: a housing having an interior portion driving and driven shafts extending into said housing, clutch means in said housing comprising interengageable friction elements drivingly connected to one of said driving or driven shafts and a hydraulically operated actuating assembly adapted to provide for selective engagement of said friction elements and a unitary casing drivingly connected to said driving shafts and adapted to mount certain of said friction elements as well as said actuating assembly, said actuating assembly particularly including a hydraulically actuated piston and an annular Belleville diaphragm adapted to impart thrust of said piston to said friction elements to promote clutch engagement, brake means mounted on said driven shaft and having an annular portion spaced radially outwardly of said unitary casing and adapted to engage the interior portion of said housing, said piston and brake means each having cooperating means spaced radially inwardly of said Belleville diaphragm and adapted to impart thrust from said piston to said brake means upon engagement of said friction elements.

2. The combination comprising:
   (A) A housing, driving and driven shafts journalled in said housing and adapted for rotation therein, said housing having an annular integral protuberance providing a braking shoulder and is disposed closely adjacent the outer periphery thereof,
   (B) Means defining a hydraulically actuated clutch in said housing adapted for providing selective conjoint rotation of said driving and driven shafts, said clutch defining means comprising:
       (1) an outer casing, connected to said driving shaft and journalling one end of said driven shaft, said casing carrying friction elements journalled therein and disposed closely adjacent the casing outer periphery, said casing having a reduced portion providing an annular piston chamber disposed closely adjacent said driven shaft,
       (2) a hub drivingly connected to said driven shaft and carrying friction elements adapted for interengagement with said casing friction elements,
       (3) a pressure element slidably disposed in said casing and adapted to be moved for promoting engagement of said elements,
       (4) an annular piston slidable in said chamber and having a central neck extending outwardly from one side thereof,
       (5) a Belleville diaphragm interconnecting said piston closely adjacent said neck with said pressure elements, said diaphragm reacting against a portion of said casing closely adjacent the outer periphery thereof for imparting thrust to said pressure element upon movement of said piston,
       (6) means providing a selective source of pressure communication with said chamber to urge said piston to promote clutch engagement,
   (C) Brake means comprising a thin plate carrying an annular friction ring at the outer periphery thereof and adapted for engaging said housing shoulder, pins slidably extending through said hub and carrying the inner periphery of said plate at one side of said hub and carrying a bumper ring at the other side of said hub closely adjacent said driven shaft, and coiled spring means disposed annularly around said hub and urging said bumper ring and hub apart to promote engagement of said brake means, said piston neck bumping said bumper ring during clutch engagement to overcome the effect of said coiled spring and disengage said brake means.

3. A power take-off unit comprising a housing having an interior portion input and output shafts, actuating means including servo-operated clutch pack adapted to effect selective driving and disconnected relationship between said shafts, said actuating means comprising a hub drivingly associated with a first one of said shafts, friction brake defining means engageable in response to the disengagement of said clutch pack to effect release of said driving relationship to stop the free rotation of said first one of said shafts and operable in response to the engagement of said clutch pack to effect disengagement of said brake, said brake defining means being particularly characterized by the inclusion of thin disc means, means drivingly connecting said disc means with said hub providing for a limited relative axial movement of said disc means with reference to said hub, resilient means normally urging said disc means to engage said portion of said housing for providing the braking effect and means carried by said disc means adapted to be engaged by said clutch pack means during the engaging phase of operation of the clutch means to overcome the effect of said resilient means and disengage said brake means.

References Cited by the Examiner

UNITED STATES PATENTS

| | | |
|---|---|---|
| 2,221,014 | 11/40 | Williamson. |
| 2,861,482 | 11/58 | Schjolin _____ 192—13 X |
| 2,930,460 | 3/60 | Isaacson. |
| 2,998,872 | 9/61 | Sommer et al. |
| 3,000,478 | 9/61 | Carter. |

DAVID J. WILLIAMOWSKY, *Primary Examiner.*

THOMAS J. HICKEY, *Examiner.*